No. 871,034. PATENTED NOV. 12, 1907.
E. W. EVANS.
SIGHT FOR FIREARMS.
APPLICATION FILED FEB. 28, 1907.
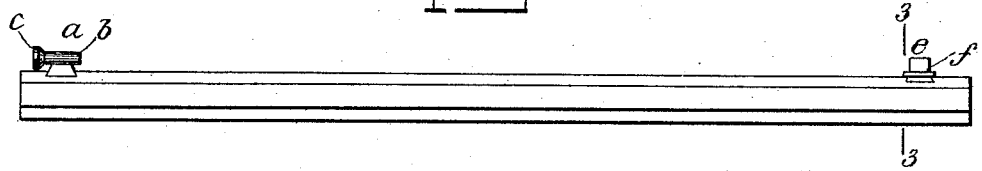
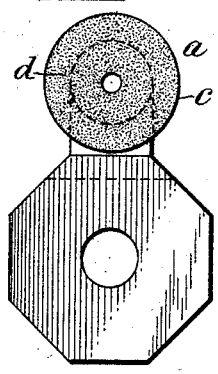
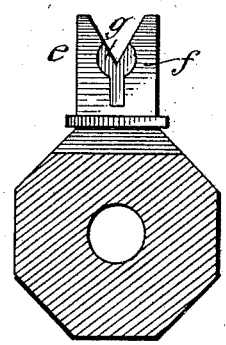
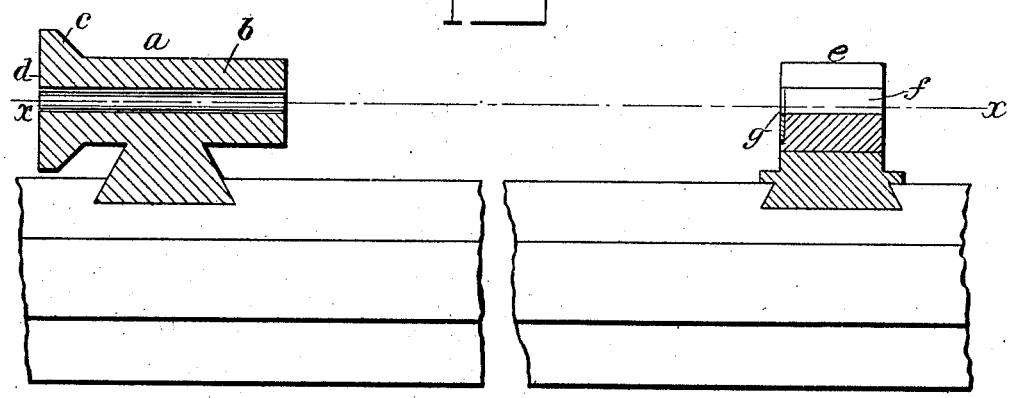
WITNESSES
INVENTOR
Evan William Evans
BY
ATTORNEYS

UNITED STATES PATENT OFFICE.

EVAN WILLIAM EVANS, OF GREENWOOD, BRITISH COLUMBIA, CANADA.

SIGHT FOR FIREARMS.

No. 871,034.　　Specification of Letters Patent.　　Patented Nov. 12, 1907.

Application filed February 28, 1907. Serial No. 359,714.

*To all whom it may concern:*

Be it known that I, EVAN WILLIAM EVANS, a subject of the King of Great Britain, and a resident of Greenwood, in the Province of British Columbia and the Dominion of Canada, have invented new and useful Improvements in Sights for Firearms, of which the following is a full, clear, and exact description.

My invention relates to sights for fire arms, and has for its principal object to provide sights for fire arms which will prevent the blurring of the vision of the marksman when he is aiming at a mark.

A further object of the invention is to provide the sights with surfaces which will give such a contrast, as will assist the marksman when aiming at dark objects.

Reference is to be had to the accompanying drawings which illustrate the embodiment of my invention described in this specification, the scope of the invention being set forth in the appended claims.

In the drawings Figure 1 is a side view of a rifle-barrel on which the sights are mounted; Fig. 2 is an end view of the breech of the rifle-barrel showing the rear or peep sight; Fig. 3 is a sectional view on the line 3—3 of Fig. 1, showing the front or muzzle sight; and Fig. 4 is a view showing the sights with relation to each other on the rifle barrel.

The rear or peep sight $a$ consists of a tube $b$ extending longitudinally of the rifle barrel, the rear end of which is enlarged to form an annular outer flange $c$, the rear face $d$ of which is roughened to prevent the glistening of light. The front or muzzle sight $e$ consists of a piece of metal or other suitable material $f$ which has a V-shaped opening at its top extending longitudinally of the rifle barrel, with the apex of the V slightly below the usual bead in taking aim, so as to permit the mark to be in clear view below as well as above the said usual bead. In the rear face of the front or muzzle sight is inlaid a Y-shaped piece of light colored metal $g$ made to register with the V in the said front or muzzle sight. By constructing the front or muzzle sight in this manner with relation to the rear or peep sight, it is possible for the marksman to aim at any object at any distance without danger of his vision becoming blurred. The eye can be focused only on one object at a time and it is therefore important not to distract the vision of the marksman by the sights on the rifle barrel.

With my rifle sight it is possible for a marksman to focus his eye on the mark without the focus of the eye being impaired by either the front or rear sights within the range of vision. This I am able to do by roughening the rear face of the rear or peep sight, and by inlaying a light-colored piece of metal in the rear face of the front or muzzle sight, a contrast is afforded which will enable the marks-man to quickly find the mark through the sights while, as the front or muzzle sight is constructed to permit of the marksman drawing the bead above the bottom of the V in the front or muzzle sight, the focus of his eye on the mark is interfered with as little as possible. The sights are mounted on the rifle barrel in the usual manner. Fig. 4 illustrates the sights mounted on the rifle barrel, the line $x$—$x$ representing a ray of light passing through the sights.

It is understood that while this invention is described with relation to hand-arms, it may be used on all classes of fire arms, on surveyors' instruments, and on all other devices which are or may be used for drawing a bead or straight line between two points near or distant from each other.

Having thus described my invention, I claim as new and desire to secure by Letters Patent:

1. In sights for fire arms, a rear sight tubular in form with an outer flange on its rear face, the rear surfaces of said sight and flange being roughened on its rear face, and a front sight with a V-shaped opening at its top on the rear face of which is attached a Y-shaped piece of material.

2. In sights for fire arms, a rear sight tubular in form with an outer flange on its rear face, the rear surfaces of said sight and flange being roughened, and a front sight with a V-shaped opening at its top on the rear face of which is attached a piece of light colored metal.

3. In sights for fire arms, a rear sight tubular in form with an outer flange on its rear face, the rear surfaces of which flange and sight are of a dull color, and a front sight with a V-shaped opening at its top having a light colored surface on its rear face.

4. In sights for fire arms, a rear sight having a rough surface on its rear face, and a front sight having a V-shaped opening longitudinally of the rifle-barrel, and a Y-shaped piece of light colored material inlaid in the rear face of the front sight, and made to register with the V in the sight.

5. In sights for fire arms, a rear sight tubular in form with an outer flange on its rear face the rear surface of which is roughened, and a front sight having a V-shaped opening and a piece of light colored metal inlaid in the rear face of the front sight and made to register with the V.

6. A sight for fire arms having a V-shaped opening and in the rear of the sight a Y-shaped piece of light colored material attached to register with the bottom of the V in the sight, the said Y-shaped piece of light colored material not extending to the top of the sight.

In testimony whereof I have signed my name to this specification in the presence of two subscribing witnesses.

EVAN WILLIAM EVANS.

Witnesses:
J. R. BROWN,
ED. ANDERSON.